US012794665B2

(12) United States Patent
Lu et al.

(10) Patent No.: US 12,794,665 B2
(45) Date of Patent: Nov. 10, 2026

(54) SECURE MULTI-PARTY COMPUTATION METHODS AND APPARATUSES

(71) Applicant: Alipay (Hangzhou) Information Technology Co., Ltd., Hangzhou (CN)

(72) Inventors: Yufei Lu, Hangzhou (CN); Lei Wang, Hangzhou (CN); Lei Zhang, Hangzhou (CN); Jinming Cui, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 167 days.

(21) Appl. No.: 18/298,464

(22) Filed: Apr. 11, 2023

(65) Prior Publication Data

US 2023/0327851 A1 Oct. 12, 2023

(30) Foreign Application Priority Data

Apr. 12, 2022 (CN) ......................... 202210380969.0

(51) Int. Cl.
*H04L 9/00* (2022.01)
*G06F 7/72* (2006.01)

(52) U.S. Cl.
CPC .............. *H04L 9/008* (2013.01); *G06F 7/728* (2013.01); *H04L 2209/46* (2013.01)

(58) Field of Classification Search
CPC ...... H04L 9/008; H04L 2209/46; G06F 7/728
See application file for complete search history.

(56) References Cited

U.S. PATENT DOCUMENTS

| | | | |
|---|---|---|---|
| 8,719,324 B1 | 5/2014 | Koc et al. | |
| 10,817,262 B2 * | 10/2020 | Carr | G06F 7/728 |

(Continued)

FOREIGN PATENT DOCUMENTS

| | | | |
|---|---|---|---|
| CN | 102207847 A | 10/2011 | |
| CN | 106685663 A | 5/2017 | |

(Continued)

OTHER PUBLICATIONS

Fedai.org [online], "Federated AI Ecosystem," available on or before Oct. 18, 2007, via Internet Archive: Wayback Machine URL<http://web.archive.org/web/20070801000000*/www.fedai.org>, retreived on May 15, 2023, URL<https://www.fedai.org>, 6 pages.

Github.com [online], "FederatedAI/FATE," available on or before Apr. 17, 2020, via Internet Archive: Wayback Machine URL<http://web.archive.org/web/20200801000000*/https://github.com/FederatedAI/FATE>, retreived on May 15, 2023, URL<https://github.com/FederatedAI/FATE>, 4 pages.

Xing et al., "Privacy-preserving mining of association rules based on paillier encryption algorithm," Chinese Journal of Network and Information Security, Jan. 2016, 2(1):53-59 (with English abstract).

(Continued)

*Primary Examiner* — Sheweaye Gelagay
*Assistant Examiner* — Thomas A Carnes
(74) *Attorney, Agent, or Firm* — Fish & Richardson P.C.

(57) ABSTRACT

Embodiments of this specification provide computer-implemented methods, apparatuses, computer-readable media and systems for secure multi-party computation. According to an example computer-implemented method, a first party performs a first mapping operation and homomorphic encryption on first plaintext data to obtain a first converted ciphertext in a Montgomery state, where the first mapping operation converts data from an integer ring to the Montgomery state. The first party sends the first converted ciphertext to a second party. Then, the second party performs a first homomorphic operation in the Montgomery state based on the first converted ciphertext to obtain a first result ciphertext in the Montgomery state, where the first homomorphic operation includes a modular multiplication operation.

16 Claims, 5 Drawing Sheets

(56) References Cited

U.S. PATENT DOCUMENTS

| | | | | |
|---|---|---|---|---|
| 11,296,861 | B1 * | 4/2022 | Zhang | H04L 9/3033 |
| 2012/0288086 | A1 * | 11/2012 | Schaffer | G06F 7/724<br>380/28 |
| 2019/0036678 | A1 * | 1/2019 | Ahmed | H04L 9/008 |
| 2019/0386814 | A1 | 12/2019 | Ahmed | |
| 2022/0147873 | A1 * | 5/2022 | Zhang | G06F 9/5027 |
| 2023/0327851 | A1 * | 10/2023 | Lu | H04L 9/008<br>713/189 |

FOREIGN PATENT DOCUMENTS

| | | | | | |
|---|---|---|---|---|---|
| CN | 107104796 | A | | 8/2017 | |
| CN | 107425974 | A | | 12/2017 | |
| CN | 112070222 | B | | 1/2021 | |
| CN | 112199707 | A | | 1/2021 | |
| CN | 112865954 | A | | 5/2021 | |
| CN | 112988237 | A | | 6/2021 | |
| CN | 113032848 | A | | 6/2021 | |
| CN | 113946846 | A | | 1/2022 | |
| CN | 114021734 | A | | 2/2022 | |
| CN | 114239019 | A | | 3/2022 | |
| CN | 114793155 | B | * | 1/2025 | H04L 9/008 |
| EP | 2523098 | A2 | * | 11/2012 | G06F 7/724 |

OTHER PUBLICATIONS

Extended European Search Report in European Appln. No. 23167642.0, mailed on Sep. 19, 2023, 6 pages.

Tran et al., "Implementing Homomorphic Encryption Based Secure Feedback Control, " CoRR, submitted on Mar. 27, 2019, arXiv: 1902.06899v2, 22 pages.

* cited by examiner

SECURE MULTI-PARTY COMPUTATION METHODS AND APPARATUSES

CROSS-REFERENCE TO RELATED APPLICATIONS

This application claims priority to Chinese Patent Application No. 202210380969.0, filed on Apr. 12, 2022, which is hereby incorporated by reference in its entirety.

TECHNICAL FIELD

One or more embodiments of this specification relate to joint data processing, and in particular, to privacy-protection-based secure multi-party computation methods and apparatuses.

BACKGROUND

With the development of computer technologies, joint data processing has been applied to various technical fields for analyzing and processing various types of service data. Typically, for example, data needed for federated machine learning often involves a plurality of fields. For example, in a machine-learning-based merchant classification analysis scenario, an electronic payment platform has transaction record data of merchants, an electronic commerce platform stores sales data of the merchants, and a bank institution has loan data of the merchants. Data often exists in the form of islands. Due to problems such as data security and user privacy, data integration faces great resistance, and it is difficult to integrate data scattered on various platforms to train a machine learning model. Therefore, it is proposed that a plurality of parties jointly perform data processing and model training on the premise of protecting privacy, so that data is available but invisible.

To implement privacy protection of data in a joint data processing process, a plurality of secure multi-party computation (MPC) methods are proposed, among which homomorphic encryption is widely applied. However, computation performance of homomorphic encryption needs to be further improved due to computation complexity of homomorphic encryption.

Therefore, it is desirable to have an improved solution to improve computation performance of a homomorphic encryption computation process, so that the homomorphic encryption computation process is better applied to privacy-protection-based multi-party joint data processing.

SUMMARY

One or more embodiments of this specification describe secure multi-party computation methods and apparatuses, to improve computation performance by using Montgomery reduction in a ciphertext computation stage of homomorphic encryption.

According to a first aspect, a secure multi-party computation method is provided. The method includes the following: a first party performs a first mapping operation and homomorphic encryption on first plaintext data to obtain a first converted ciphertext in a Montgomery state, where the first mapping operation is used to convert data from an integer ring to the Montgomery state; the first party sends the first converted ciphertext to a second party; and the second party performs a first homomorphic operation in the Montgomery state based on the first converted ciphertext to obtain a first result ciphertext in the Montgomery state, where the first homomorphic operation includes a modular multiplication operation.

According to one or more implementations, the method further includes the following: the second party sends the first result ciphertext to the first party; and the first party performs Montgomery reduction and a decryption operation on the first result ciphertext to obtain a first result plaintext.

According to one or more other implementations, the method further includes the following: the second party sends the first result ciphertext to a third party; and the third party performs a second homomorphic operation in the Montgomery state based on the first result ciphertext to obtain a second result ciphertext.

In one or more embodiments, that the first party performs a first mapping operation and homomorphic encryption on first data to obtain a first converted ciphertext in a Montgomery state specifically includes the following: the first party performs homomorphic encryption on the first plaintext data to obtain a first original ciphertext; and converts the first ciphertext to the Montgomery state by using the first mapping operation, to obtain the first converted ciphertext.

In one or more other embodiments, that the first party performs a first mapping operation and homomorphic encryption on first data to obtain a first converted ciphertext in a Montgomery state specifically includes the following: the first party converts the first plaintext data to the Montgomery state by using the first mapping operation, to obtain a first converted plaintext; and performs an encryption operation on the first converted plaintext in the Montgomery state to obtain the first converted ciphertext.

According to one or more implementations, the method further includes the following: the second party obtains a second converted ciphertext in the Montgomery state; and the obtaining a first result ciphertext in the Montgomery state specifically includes performing the first homomorphic operation on the first converted ciphertext and the second converted ciphertext to obtain the first result ciphertext.

In one or more embodiments of the previous implementations, the second party receives the second converted ciphertext from the first party.

In one or more other embodiments of the previous implementations, the second party performs the first mapping operation and homomorphic encryption on local second plaintext data of the second party to obtain the second converted ciphertext.

According to one or more implementations, the first plaintext data is parameter data of a service prediction model, and the second plaintext data is characteristic data of a service object.

According to a second aspect, a secure multi-party computation method is provided. The method is executed by a first party and includes the following: a first mapping operation and homomorphic encryption are performed on first plaintext data to obtain a first converted ciphertext in a Montgomery state, where the first mapping operation is used to convert data from an integer ring to the Montgomery state; the first converted ciphertext is sent to a second party; a result ciphertext is received from a third party, where the result ciphertext is obtained by performing a homomorphic operation in the Montgomery state based on the first converted ciphertext, and the homomorphic operation includes a modular multiplication operation; and Montgomery reduction and a decryption operation are performed on the result ciphertext to obtain a result plaintext.

According to a third aspect, a secure multi-party computation method is provided. The method is executed by a second party and includes the following: a first converted ciphertext in a Montgomery state is received from a first party, where the first converted ciphertext is obtained by the first party by performing a first mapping operation and homomorphic encryption on first plaintext data, and the first mapping operation is used to convert data from an integer ring to the Montgomery state; a first homomorphic operation is performed in the Montgomery state based on the first converted ciphertext to obtain a first result ciphertext in the Montgomery state, where the first homomorphic operation includes a modular multiplication operation; and the first result ciphertext is sent.

According to a fourth aspect, a secure multi-party computation system is provided. The system includes a first party and a second party.

The first party is configured to perform a first mapping operation and homomorphic encryption on first plaintext data to obtain a first converted ciphertext in a Montgomery state, where the first mapping operation is used to convert data from an integer ring to the Montgomery state.

The first party is further configured to send the first converted ciphertext to a second party.

The second party is configured to perform a first homomorphic operation in the Montgomery state based on the first converted ciphertext to obtain a first result ciphertext in the Montgomery state, where the first homomorphic operation includes a modular multiplication operation.

According to a fifth aspect, a secure multi-party computation apparatus is provided. The apparatus is deployed in a first party and includes: an encryption conversion unit, configured to perform a first mapping operation and homomorphic encryption on first plaintext data to obtain a first converted ciphertext in a Montgomery state, where the first mapping operation is used to convert data from an integer ring to the Montgomery state; a sending unit, configured to send the first converted ciphertext to a second party; a receiving unit, configured to receive a result ciphertext from a third party, where the result ciphertext is obtained by performing a homomorphic operation in the Montgomery state based on the first converted ciphertext, and the homomorphic operation includes a modular multiplication operation; and a decryption conversion unit, configured to perform Montgomery reduction and a decryption operation on the result ciphertext to obtain a result plaintext.

According to a sixth aspect, a secure multi-party computation apparatus is provided. The apparatus is deployed in a second party and includes: a receiving unit, configured to receive a first converted ciphertext in a Montgomery state from a first party, where the first converted ciphertext is obtained by the first party by performing a first mapping operation and homomorphic encryption on first plaintext data, and the first mapping operation is used to convert data from an integer ring to the Montgomery state; an operation unit, configured to perform a first homomorphic operation in the Montgomery state based on the first converted ciphertext to obtain a first result ciphertext in the Montgomery state, where the first homomorphic operation includes a modular multiplication operation; and a sending unit, configured to send the first result ciphertext.

According to a seventh aspect, a computer-readable storage medium is provided. The computer-readable storage medium stores a computer program. When the computer program is executed in a computer, the computer is enabled to perform the method according to any one of the previous first to third aspects.

According to a fourth aspect, a computation device is provided. The device includes a memory and a processor. The memory stores executable code, and the processor implements the method according to any one of the previous first to third aspects when executing the executable code.

In the secure multi-party computation solutions provided in the embodiments of this specification, a ciphertext is kept in the Montgomery state, so that computation performance of a ciphertext computation stage can be improved by using Montgomery reduction.

BRIEF DESCRIPTION OF DRAWINGS

To describe the technical solutions in the embodiments of this application more clearly, the following briefly describes the accompanying drawings needed for describing the embodiments. Clearly, the accompanying drawings in the following descriptions show merely some embodiments of this application, and a person of ordinary skill in the art can still derive other accompanying drawings from these accompanying drawings without creative efforts.

DESCRIPTION OF EMBODIMENTS

Figure 1:
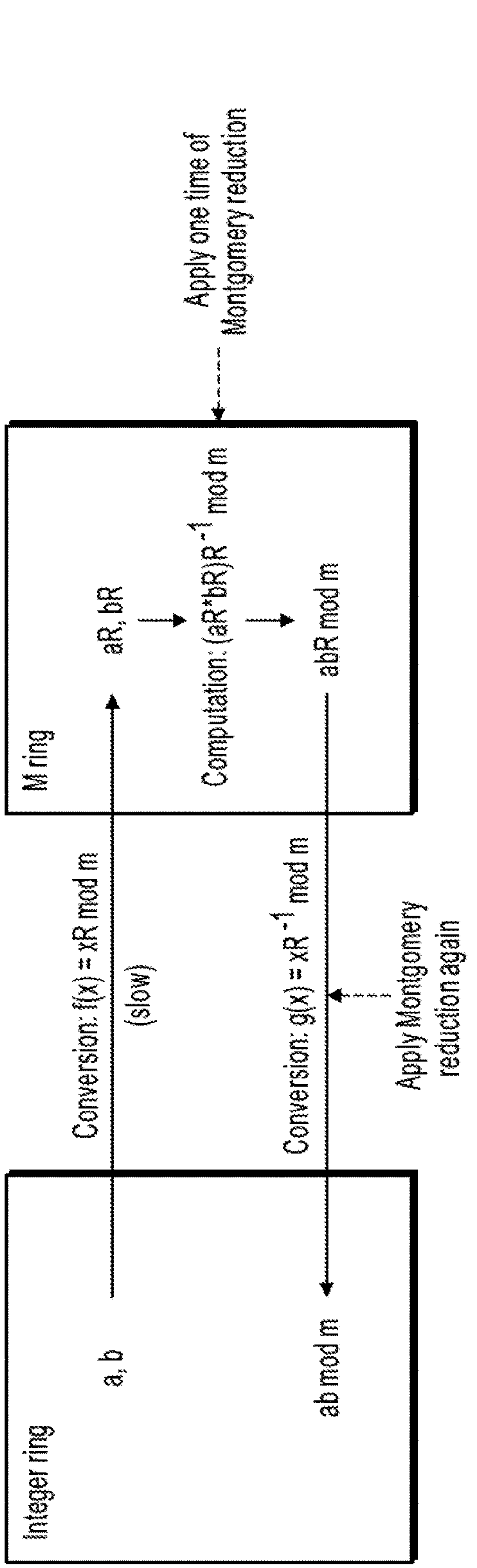
FIG. 1 is a schematic diagram illustrating performing a modular multiplication operation by using Montgomery reduction.

The solutions provided in this specification are described below with reference to the accompanying drawings.

As previously described, homomorphic encryption is a cryptographic technology that can protect data privacy and can also implement data computation when a plurality of parties jointly perform a data operation. Homomorphic encryption allows that a computation party performs an operation on a ciphertext and obtains a result that is still encrypted, where a result obtained by decrypting the result is the same as a result obtained by performing the same operation on a plaintext.

Specifically, the homomorphic encryption algorithm is such an encryption function that a result of performing an operation on a plaintext and then performing encryption is equivalent to a result of performing encryption and then performing a corresponding operation on a ciphertext. For example, V, and $v_2$ are encrypted by using the same public key PK, to obtain $E_{PK}(v1)$ and $E_{PK}$ $(v_2)$. If the following equation is satisfied:

$$E_{PK}(v_1+v_2)=E_{PK}(v_1)\oplus E_{PK}(v_2) \tag{1}$$

it can be considered that the encryption algorithm satisfies addition homomorphism, where ⊕ is a corresponding homomorphic addition operation.

For example, the Paillier algorithm is a common encryption algorithm that satisfies addition homomorphism. Specifically, the Paillier algorithm uses an asymmetric encryption manner in which a public key is used for encryption and a private key is used for decryption. The public key can be represented as (N, g), where N is a natural number and can be represented as a product of two larger prime numbers p and q: N=p*q, and g is a natural number less than $N^2$ and satisfying a specific mathematical condition. In practice, g=N+1 can be taken. According to the Paillier encryption algorithm, when a message m is encrypted by using a public key PK, a ciphertext c can be expressed as follows:

$$c = g^m * r^N = (N+1)^m * r^N (\mathrm{mod}\, N^2), \tag{2}$$

where r is a random number used for encryption, and mod is a modulo operation.

Based on the ciphertext form shown in equation (2), it is easy to verify that the Paillier algorithm satisfies the following equation:

$$E_{PK}(v_1 + v_2) = E_{PK}(v_1) \cdot E_{PK}(v_2) \tag{3}$$

In this case, ciphertext multiplication $E_{PK}(v_1) \cdot E_{PK}(v_2)$ corresponds to a homomorphic addition operation.

On the basis of the Paillier algorithm, a plurality of improved algorithms are also proposed, such as the OU (Okamoto-Uchiyama) algorithm and the DJ (Damgird-Jurik) algorithm. Similar to the encryption and operation rules of Paillier, in encryption and operation rules of the improved algorithms, power operations and modulo operations are involved in encryption processes, and ciphertext multiplication is involved in ciphertext operation stages.

Computation can be performed on a ciphertext in the homomorphic encryption algorithm, and it is a very ideal feature for data processing of privacy protection. Therefore, the homomorphic encryption algorithm can be applied to a joint computation scenario as a common secure multi-party computation means. However, a homomorphic encryption computation process is several orders of magnitude slower than plaintext computation in computation performance. It is a constraint for further popularization and application of the homomorphic encryption algorithm.

It can be seen from the analysis that, regardless of Paillier, OU, or another homomorphic encryption algorithm, a computation process of the homomorphic encryption algorithm is performed in modulo space, and a large quantity of modulo operations are involved. It is a main factor of low performance of the homomorphic encryption operation. It can be seen by a person skilled in the art that the modulo operation involves division, and division is relatively slow in computation on a CPU. Specifically, a computation process of a mod m is shown in the following equation (4):

$$a \bmod m = a - \left\lfloor \frac{a}{m} \right\rfloor \cdot m, \tag{4}$$

where $\lfloor\ \rfloor$ represents rounding down. It can be seen from equation (4) that, computation of a mod m involves one time of division, one time of multiplication, and one time of subtraction. Multiplication and subtraction are relatively fast in computation on the CPU, and division needs to consume a large amount of time.

To avoid a division operation in a modulo process to accelerate modulo computation, Montgomery reduction, also referred to as the Montgomery statute, is proposed. Montgomery reduction aims to calculate a value of a mod m without division.

Specifically, Montgomery reduction can be described as follows: m is set to an integer and represents modulo space; and R is an integer related to m and taken based on a base of a numbering system, R>m, and m is mutually prime with R. In this case, for a given integer T, a Montgomery reduction computation result of the integer is $TR^{-1}$ mod m. When appropriate R is selected, a value of $TR^{-1}$ mod m can be fast calculated by using Montgomery reduction. In the computation process, traditional division is replaced with a simple shift operation to implement a fast modulo operation.

Montgomery reduction cannot be directly applied, and numbers need to satisfy a specific form when Montgomery reduction is used. For example, to calculate a mod m, R (a value related to m as previously described) is first calculated based on m, and then $TR^{-1}$ mod m can be fast calculated if a satisfies the form of $TR^{-1}$. Therefore, an important step in using Montgomery reduction is constructing the form of $TR^{-1}$. An actual example is used below to describe how to use Montgomery reduction to accelerate a modulo-related operation.

FIG. 1 is a schematic diagram illustrating performing a modular multiplication operation by using Montgomery reduction. In the example in FIG. 1, assume that a and b are integers in integer ring Z and m is a positive integer, in the example, a*b mod m attempts to be calculated, i.e. modular multiplication of a and b attempts to be performed.

As shown in FIG. 1, the modular multiplication operation is performed by applying Montgomery reduction, and an operation process mainly includes the following steps.

First, a mapping function f(x) is used to respectively convert a and b from the integer ring (hereinafter referred to as a Z ring) to a Montgomery ring (hereinafter referred to as an M ring), to obtain results aR and bR in a Montgomery state. As shown in FIG. 1, here, the mapping function f(x)=xR mod m is used to map an input integer x to the Montgomery ring, where xR is denoted as a mapping result of x in the Montgomery state.

Then, T=aR*bR (one time of regular multiplication) is calculated in the Montgomery state, and then one time of Montgomery reduction is applied to obtain $aR*bR*TR^{-1}$ mod m=abR mod m. The result is a result in the M ring or the Montgomery state.

Finally, the result abR mod m in the M ring is mapped back to the Z ring by applying Montgomery reduction again to obtain ab mod m, i.e. a desired target computation result.

Figure 2:
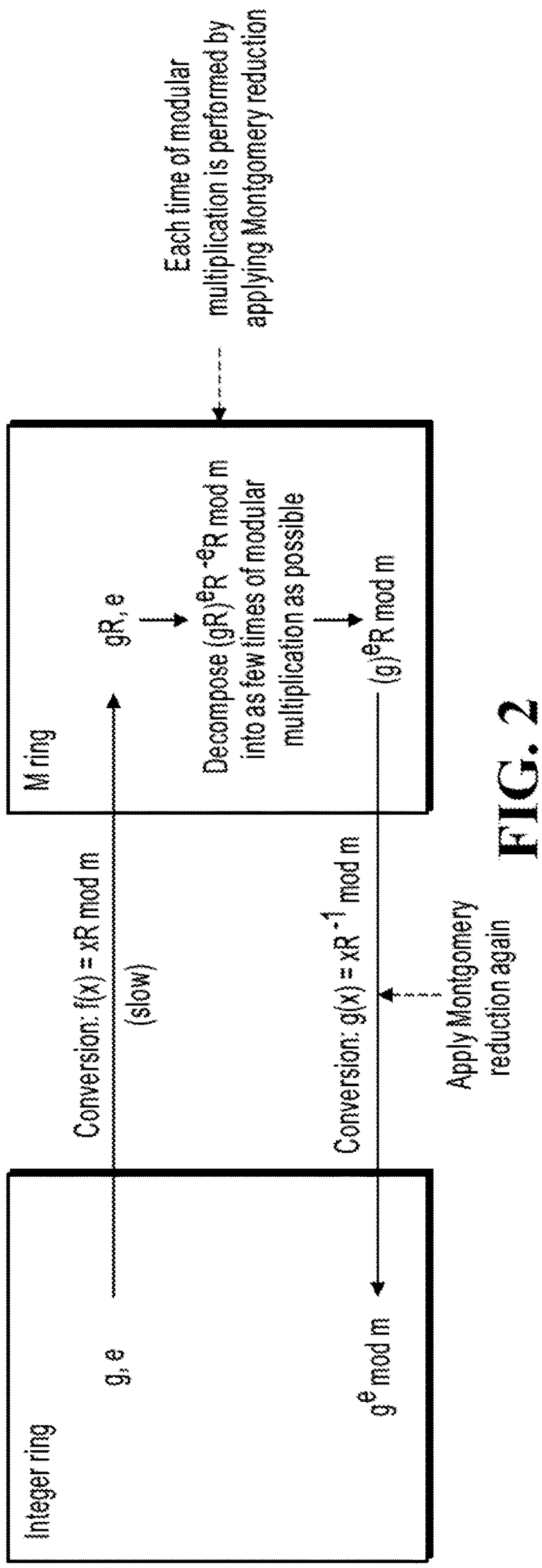
FIG. 2 is a schematic diagram illustrating performing a modular exponentiation operation by using Montgomery reduction.

FIG. 2 is a schematic diagram illustrating performing a modular exponentiation operation by using Montgomery reduction. In the example in FIG. 2, assume that g is an integer in integer ring Z and e and m are positive integers, in the example, g^e mod m attempts to be calculated, i.e. modular exponentiation of g attempts to be performed.

As shown in FIG. 2, the modular exponentiation operation is performed by applying Montgomery reduction, and an operation process mainly includes the following steps.

First, a mapping function f(x) is used to convert g from the integer ring to a Montgomery ring, to obtain a result gR in a Montgomery state. Then, in the Montgomery state, gR raised to the power of e is decomposed into a plurality of times of modular multiplication, each time of modular multiplication is performed by applying one time of Montgomery reduction, and a result $(g)^e R$ mod m in the M state is finally obtained. Finally, the result in the M ring is mapped back to the Z ring by applying Montgomery reduction again to obtain $g^e$ mod m, i.e. a target computation result.

It can be seen from the examples in FIG. 1 and FIG. 2 that, if a modulo operation is performed by using Montgomery reduction, first, a mapping function f(x) needs to be used to map a value x to be calculated from an integer ring Z ring to an M ring. However, computation of xR mod m in f(x) involves division, and performance is relatively low. Therefore, conversion from the Z ring to the M ring is relatively slow.

Therefore, in the example in FIG. 1, although modular multiplication computation can be completed by using Montgomery reduction, in view of time-consuming conversion from the Z ring to the M ring, performance in this case is lower than performance in the case of directly performing multiplication and modulo operations in the Z ring. In the example in FIG. 2, g^e is decomposed into many times of modular multiplication, and benefits brought by the many times of modular multiplication are enough to cancel overheads of conversion from the Z ring to the M ring. Therefore, computation can be accelerated when Montgomery reduction is used in the modular exponentiation operation.

An encryption process of the homomorphic encryption algorithm generally involves a large quantity of modular exponentiation operations. For example, references can be made to the encryption process of the Paillier algorithm shown in Equation (2). Therefore, an encryption stage of the homomorphic encryption algorithm can be accelerated by using Montgomery reduction. However, a ciphertext operation stage of the homomorphic encryption algorithm, for example, homomorphic addition shown in equation (3), generally involves a modular multiplication operation. As previously described, in the modular multiplication operation, performance obtained by using Montgomery reduction is not higher than performance obtained by directly performing computation. Therefore, in conventional technologies, a homomorphic ciphertext operation cannot be accelerated by using Montgomery reduction.

In view of this, the inventors have proposed a new solution architecture. In the architecture, an encryption party keeps an encrypted ciphertext in a Montgomery state, so that a computation party can perform a homomorphic ciphertext operation in the Montgomery state by using Montgomery reduction, including a modular multiplication operation, thereby greatly improving computation performance of a ciphertext operation stage. Implementations of the solution architecture are described in detail below.

Figure 3:
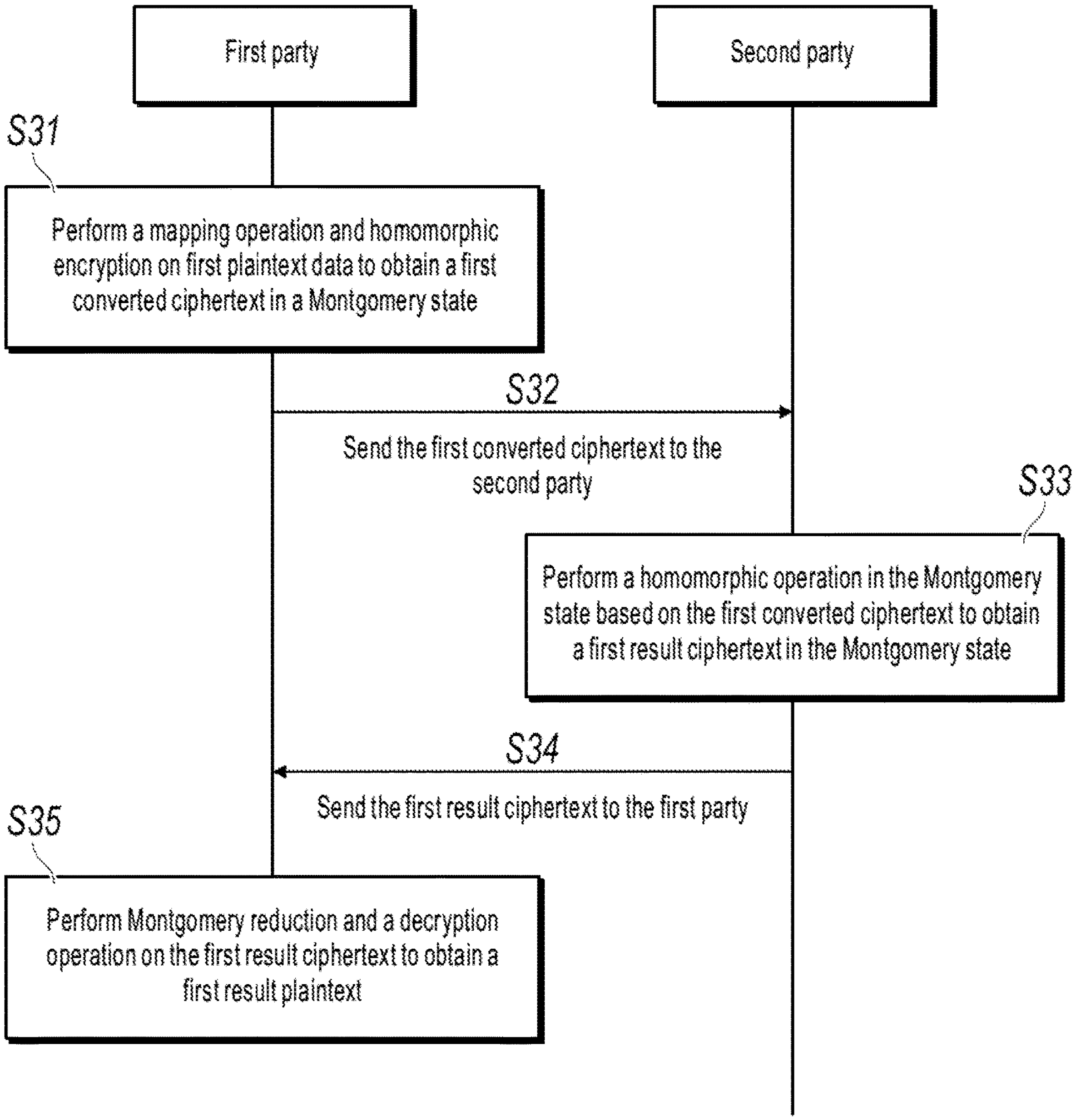
FIG. 3 is a schematic diagram illustrating a computation process of secure multi-party computation, according to one or more embodiments.

FIG. 3 is a schematic diagram illustrating a computation process of secure multi-party computation, according to one or more embodiments. In the example in FIG. 3, secure multi-party computation involves a first party and a second party. The first party acts as an encryption party/a decryption party, and the second party acts as a ciphertext computation party. The first party and the second party can be specifically implemented as any servers, apparatuses, platforms, devices, or device clusters having computation and processing capabilities, and are not limited here. In different service scenarios of different embodiments, the first party and the second party can have different service roles. In one or more embodiments, the first party can be a model owner, having a pre-trained service prediction model that needs privacy protection, and the second party can be a model user, having characteristic data of some service objects to be tested. In one or more other embodiments, the first party can be a model user, and the second party can be a model owner. In one or more still other embodiments, the first party is a private data owner, and the second party is a computation platform.

At a preliminary stage before secure multi-party computation, the first party first generates a key pair of a homomorphic encryption algorithm, i.e. a public key PK and a private key SK. The public key PK is public, and the private key SK is held by the local party. The homomorphic encryption algorithm can be a Paillier algorithm, an OU algorithm, a DJ algorithm, etc. In these homomorphic encryption algorithms, a modular exponentiation operation is used in an encryption stage, and a modular multiplication operation is involved in a ciphertext operation stage.

After the public-private key pair is prepared, the two parties can perform secure multi-party computation.

In a secure multi-party computation process, in step 31, the first party performs a mapping operation and homomorphic encryption on first plaintext data to obtain a first converted ciphertext in a Montgomery state. Specifically, the first plaintext data, denoted as $p_1$, is private data held by the first party, and is also target data to be encrypted. The mapping operation is a mapping function used to convert data from an integer ring to the Montgomery state, for example, the previous mapping function f(x)=xR mod m. If a ciphertext obtained by performing homomorphic encryption on the first plaintext data $p_1$ is denoted as $c_1$, the first converted ciphertext in the Montgomery state obtained in step 31 can be denoted as $c_1R$.

To obtain the first converted ciphertext, in one or more embodiments, the first party first performs homomorphic encryption on the first plaintext data $p_1$ in a conventional method to obtain a first original ciphertext $c_1$; and then converts the first original ciphertext $c_1$ to the Montgomery state by using the mapping operation, to obtain the first converted ciphertext $c_1R$.

As previously described, a modular exponentiation operation can be accelerated by using Montgomery reduction in an encryption stage. Therefore, in one or more other embodiments, more advantageously, the first party can convert the first plaintext data $p_1$ to the Montgomery state by using the previous mapping operation f(x), to obtain a first converted plaintext $p_1R$; and then perform an encryption operation on the first converted plaintext $p_1R$ in the Montgomery state to obtain the first converted ciphertext $c_1R$. A process of performing the encryption operation on the first converted plaintext $p_1R$ in the Montgomery state involves the modular exponentiation operation in the M ring shown in FIG. 2. However, instead of converting the result in the M ring back to the integer ring in FIG. 2, in step 31, the first party directly outputs a result in an M ring, i.e. a result in the Montgomery state, as the first converted ciphertext $c_1R$.

Next, in step 32, the first party sends the first converted ciphertext $c_1R$ to the second party.

Then, in step 33, the second party performs a homomorphic operation in the Montgomery state based on the first converted ciphertext $c_1R$ to obtain a first result ciphertext c'R in the Montgomery state. The homomorphic operation includes a modular multiplication operation, for example, a homomorphic addition operation (corresponding to ciphertext multiplication) in the Paillier algorithm or the OU algorithm.

According to one or more implementations, the homomorphic operation includes performing a homomorphic operation, for example, homomorphic addition, on the first converted ciphertext $c_1R$ and other ciphertext data. To perform the homomorphic operation in the Montgomery state, the second party needs to ensure that the other ciphertext data is also in the Montgomery state.

In view of this, in one or more embodiments, the second party obtains a second converted ciphertext $c_2R$ in the Montgomery state. In an example, the second converted ciphertext can be from the first party, i.e. the first party obtains the second converted ciphertext $c_2R$ by encrypting and converting second plaintext data $p_2$ in a similar method to the first converted ciphertext, and then sends the second converted ciphertext $c_2R$ to the second party. In another example, the second converted ciphertext can be from the second party, i.e. the second party reads local second plaintext data $p_2$ of the second party, and performs the mapping operation and homomorphic encryption on the data to obtain the second converted ciphertext $c_2R$. It is worthwhile to understand that a public key PK is used for encryption in a homomorphic encryption process, and the public key PK is public. Therefore, the second party can obtain the second converted ciphertext $c_2R$ by encrypting and mapping the second plaintext data in a similar method in which the first party obtains the first converted ciphertext.

Then, the second party performs the homomorphic operation on the first converted ciphertext $c_1R$ and the second converted ciphertext $c_2R$ in the Montgomery state. For example, when the homomorphic operation corresponds to ciphertext multiplication, the homomorphic operation of the first converted ciphertext $c_1R$ and the second converted ciphertext $c_2R$ corresponds to the modular multiplication operation in the M ring shown in FIG. 1.

Although the homomorphic operation performed by the second party is previously described in combination with the second converted ciphertext, it is worthwhile to understand that, the homomorphic operation performed by the second party can involve more data, for example, also involve a third ciphertext, and the homomorphic operation can include more complex operations, for example, a plurality of times of modular multiplication, and a combination of modular multiplication results. Implementations are not limited here.

As such, the second party performs the homomorphic operation in the Montgomery state based on the first converted ciphertext to obtain the first result ciphertext c'R in the Montgomery state. Then, in step 34, the second party sends the first result ciphertext c'R to the first party.

Then, in step 35, the first party performs Montgomery reduction and a decryption operation on the first result ciphertext c'R to obtain a first result plaintext. Specifically, the first party can first apply Montgomery reduction to the first result ciphertext c'R to obtain a ciphertext c' in an ordinary form (in the integer ring); and then decrypt the ciphertext c' by using a private key SK held by the first party to obtain the first result plaintext.

It can be understood that the previous secure multi-party computation can be applied to a plurality of different service scenarios. In different service scenarios, data transmitted between the first party and the second party can have different service meanings. For example, when the first party is a model owner, and the second party is a model user, the first plaintext data can be model parameters of a service prediction model owned by the first party, and the first party encrypts the first plaintext data and then sends encrypted plaintext data to the second party; and the second plaintext data can be characteristic data that is of a service object and that is owned by the second party, and the second party performs a homomorphic operation based on model parameters in an encrypted state and the characteristic data, where the obtained first result ciphertext can correspond to a prediction result or an intermediate result of the service prediction model. When the first party is a model user, and the second party is a model owner, the first plaintext data can be characteristic data that is of a service object and that is owned by the first party, and the second plaintext data can be model parameters. When the first party is a data holder, and the second party is a computation platform, the first plaintext data and the second plaintext data are both private data of the first party, for example, user personal information of different projects; the first party encrypts the first plaintext data and sends encrypted plaintext data to the second party; and the second party performs a homomorphic operation on private data in an encrypted state based on a secret algorithm or model of the second party, to obtain the first result ciphertext, where the first result ciphertext corresponds to a processing result for the private data. In addition to the examples, secure multi-party computation in FIG. 3 can also be applied to other service scenarios. The service scenarios are not listed one by one here.

It is worthwhile to emphasize that, regardless of a specific scenario, in the previous process, it can be seen that the data is kept in the Montgomery state, i.e. in the form of xR, throughout the ciphertext operation stage, so that the homomorphic ciphertext operation can be continued in the Montgomery state, to facilitate computation acceleration performed by using Montgomery reduction. For example, modular multiplication is performed on two pieces of data aR and bR in the Montgomery state to obtain (ab)R. The data form does not change after modular multiplication. For abR, ab can be considered as x as a whole. Therefore, abR can continue to be multiplied by other xR to obtain abxR, and when a result finally needs to be obtained, R can be eliminated to obtain a real result abx. As such, computation is accelerated by using Montgomery reduction throughout the ciphertext computation stage, thereby improving computation performance.

It has been proved by experiments that, when the OU encryption algorithm is used, for a homomorphic addition operation between ciphertexts, performance can be improved by 3.75 times by performing operations in the Montgomery state according to the previous solutions compared with conventional ciphertext modular multiplication. For an operation of "ciphertext+plaintext", performance is also improved by two times in the previous solutions compared with conventional technologies. Therefore, according to the previous solutions, computation performance of the ciphertext operation stage is significantly improved.

Figure 4:
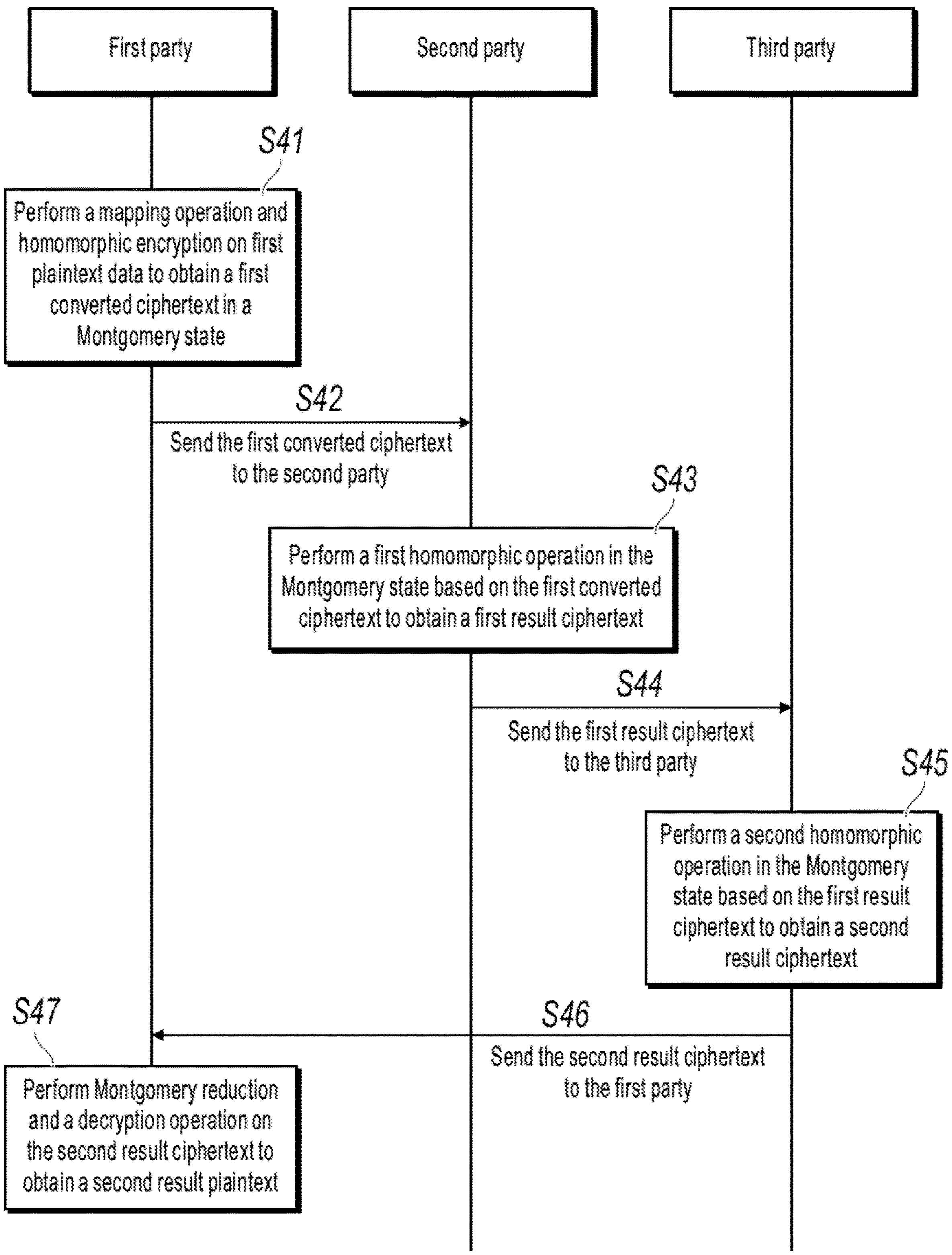
FIG. 4 is a schematic diagram illustrating a computation process of secure multi-party computation, according to one or more embodiments.

The previous solution architecture and technical concepts can also be applied to secure multi-party computation of more than two parties. FIG. 4 is a schematic diagram illustrating a computation process of secure multi-party computation, according to one or more embodiments. In the example in FIG. 4, secure multi-party computation involves a first party, a second party, and a third party. The first party acts as an encryption party/a decryption party, and the second party and the third party act as ciphertext computation parties. The parties can be specifically implemented as any servers, apparatuses, platforms, devices, or device clusters having computation and processing capabilities, and are not limited here. In one or more embodiments, the first party can be a model owner, having a pre-trained service prediction model that needs privacy protection, and the second party and the third party are both model users, each having a part of characteristic data (private data) of a service object to be tested. In one or more other embodiments, the first party is a data owner, and the second party and the third party each have a model part deployed in a distributed method. In other embodiments, the architecture can also be applied to other service scenarios.

In a secure multi-party computation process, in step 41, the first party performs a mapping operation and homomorphic encryption on first plaintext data to obtain a first converted ciphertext $c_1R$ in a Montgomery state.

Next, in step 42, the first party sends the first converted ciphertext $c_1R$ to the second party.

Then, in step 43, the second party performs a first homomorphic operation in the Montgomery state based on the first converted ciphertext $c_1R$ to obtain a first result ciphertext c'R in the Montgomery state.

Specific execution processes of the previous steps 41 to 43 are similar to the processes in FIG. 3 and details are omitted for simplicity.

Then, in step 44, the second party sends the first result ciphertext c'R to the third party.

In step 45, the third party performs a second homomorphic operation in the Montgomery state based on the first result ciphertext c'R to obtain a second result ciphertext. Specifically, the second homomorphic operation can include performing a homomorphic operation on the first result ciphertext and other converted ciphertext data, referred to as a third converted ciphertext. In an example, the third converted ciphertext is obtained by the third party by performing mapping conversion and encryption on third plaintext data locally owned by the third party. In another example, the third converted ciphertext is provided by the first party for the third party. In still another example, the third converted ciphertext is an intermediate result ciphertext obtained by performing a homomorphic operation based on a converted ciphertext provided by the first party and a local converted ciphertext of the third party. In addition, an operation method of the second homomorphic operation can be the same as or different from the operation method of the first homomorphic operation performed by the second party, and implementations are not limited here.

Then, in step 46, the third party sends the second result ciphertext to the first party.

Then, in step 47, the first party performs Montgomery reduction and a decryption operation on the second result ciphertext to obtain a second result plaintext.

The process of performing multi-party secure computation by using Montgomery reduction is previously described with reference to a scenario of two computation parties (the second party and the third party). It can be understood that the computation process can be extended to a scenario of more computation parties. For example, a fourth party is further included, and the third party sends the result ciphertext of the third party to the fourth party, so that the fourth party continues to perform a homomorphic operation on the basis of the result ciphertext. That is, after obtaining a result ciphertext, each computation party sends the result ciphertext to a subsequent computation party, so that the subsequent computation party continues an operation. Finally, a certain computation party sends a final result ciphertext to the first party, so that the first party decrypts the final result ciphertext to obtain a result plaintext.

It is worthwhile to note that in the previous computation process of a plurality of computation parties, the data is still kept in the Montgomery state throughout the ciphertext operation stage, regardless of a quantity of computation parties that the data passes through, so that the homomorphic ciphertext operation can be continued in the Montgomery state. Therefore. computation can be accelerated by using Montgomery reduction, thereby improving operation performance.

Security of the ciphertext in the Montgomery state is demonstrated below.

Figure 5:
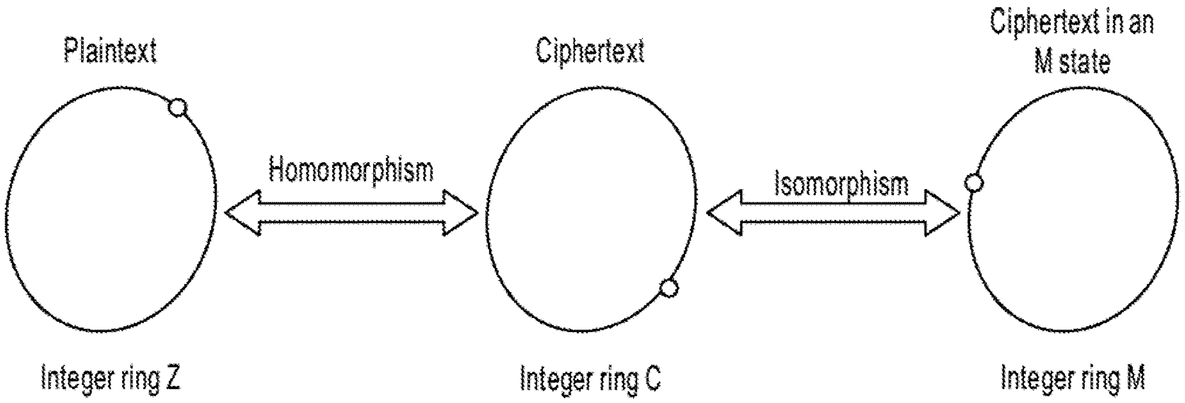
FIG. 5 illustrates a correspondence among plaintext space, ciphertext space, and Montgomery space.

FIG. 5 illustrates a correspondence among plaintext space, ciphertext space, and Montgomery space. As shown in the figure, the plaintext space corresponds to an integer ring Z, the ciphertext space corresponds to another integer ring C, and the Montgomery space corresponds to an integer ring M. Homomorphism indicates one-to-many mapping from plaintexts to ciphertexts, and isomorphism indicates one-to-one mapping from ciphertexts to Montgomery ciphertexts. Because the C ring and the M ring are in a one-to-one mapping relationship, security of a ciphertext in an M state is consistent with security of a native ciphertext. Assume that a ciphertext cR can be decrypted, an attacker can also convert a native ciphertext c to a plaintext p within 0(1) time (because conversion from c to cR can be completed within 0(1) time), and then decrypt a homomorphic encryption algorithm. However, it can be seen that a native homomorphic encryption algorithm is secure. Therefore, the assumption is not true, i.e. the ciphertext cR in the Montgomery state is also secure.

In conclusion, in the solution architecture proposed in the embodiments of this specification, computation performance can be improved by using Montgomery reduction in the ciphertext operation stage of secure multi-party computation, and security of the computation process can also be ensured.

Figure 6:
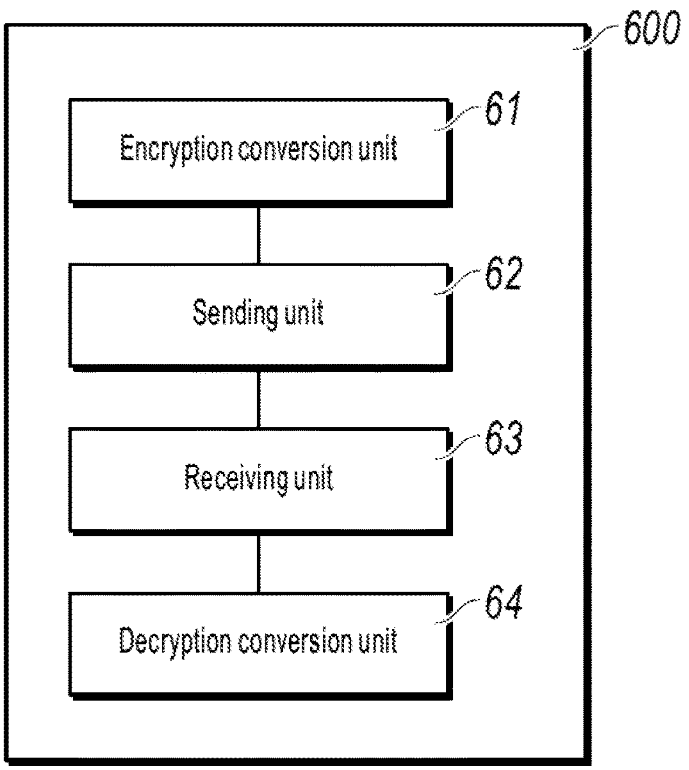
FIG. 6 is a schematic diagram illustrating a structure of a secure multi-party computation apparatus deployed in a first party, according to one or more embodiments.

In addition, corresponding to the previous secure multi-party computation process, one or more embodiments of this application further disclose a secure multi-party computation apparatus, deployed in a first party. The first party can be implemented as any computation unit, platform, server, device, etc. having computation and processing capabilities. FIG. 6 is a schematic diagram illustrating a structure of a secure multi-party computation apparatus deployed in a first party, according to one or more embodiments. As shown in FIG. 6, the apparatus 600 includes:

- an encryption conversion unit 61, configured to perform a first mapping operation and homomorphic encryption on first plaintext data to obtain a first converted ciphertext in a Montgomery state, where the first mapping operation is used to convert data from an integer ring to the Montgomery state;
- a sending unit 62, configured to send the first converted ciphertext to a second party;
- a receiving unit 63, configured to receive a result ciphertext from a third party, where the result ciphertext is obtained by performing a homomorphic operation in the Montgomery state based on the first converted ciphertext, and the homomorphic operation includes a modular multiplication operation; and
- a decryption conversion unit 64, configured to perform Montgomery reduction and a decryption operation on the result ciphertext to obtain a result plaintext.

According to one or more implementations, the second party and the third party are the same party. In one or more other implementations, the second party and the third party are different computation parties.

In one or more embodiments, the encryption conversion unit 61 is specifically configured to perform homomorphic encryption on the first plaintext data to obtain a first original ciphertext; and convert the first ciphertext to the Montgomery state by using the first mapping operation, to obtain the first converted ciphertext.

In one or more other embodiments, the encryption conversion unit 61 is specifically configured to convert the first plaintext data to the Montgomery state by using the first mapping operation, to obtain a first converted plaintext; and perform an encryption operation on the first converted plaintext in the Montgomery state to obtain the first converted ciphertext.

Figure 7:
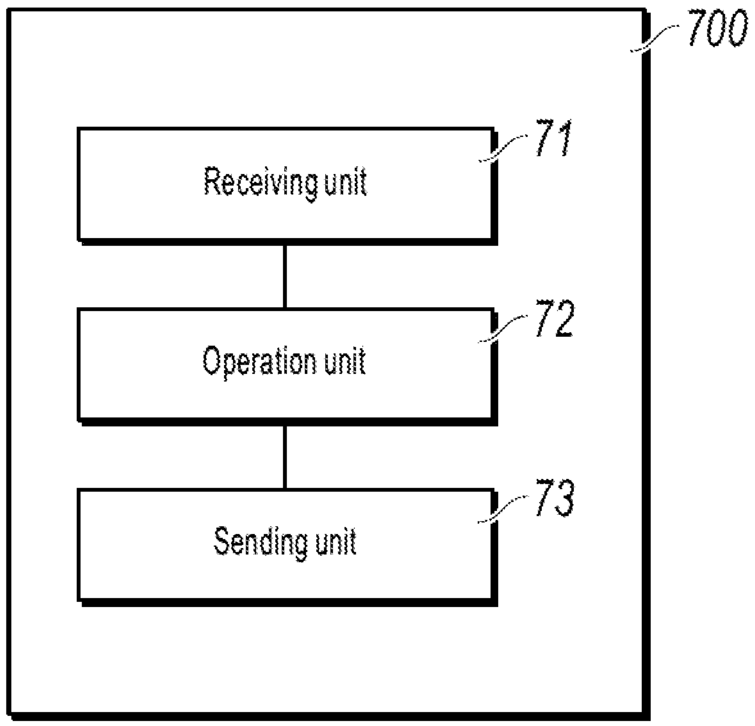
FIG. 7 is a schematic diagram illustrating a structure of a secure multi-party computation apparatus deployed in a second party, according to one or more embodiments.

According to another aspect, one or more embodiments of this specification further disclose a secure multi-party computation apparatus, deployed in a second party. The second party can be implemented as any computation unit, platform, server, device, etc. having computation and processing capabilities. FIG. 7 is a schematic diagram illustrating a structure of a secure multi-party computation apparatus deployed in a second party, according to one or more embodiments. As shown in FIG. 7, the apparatus 700 includes:

a receiving unit 71, configured to receive a first converted ciphertext in a Montgomery state from a first party, where the first converted ciphertext is obtained by the first party by performing a first mapping operation and homomorphic encryption on first plaintext data, and the first mapping operation is used to convert data from an integer ring to the Montgomery state;

an operation unit 72, configured to perform a first homomorphic operation in the Montgomery state based on the first converted ciphertext to obtain a first result ciphertext in the Montgomery state, where the first homomorphic operation includes a modular multiplication operation; and a sending unit 73, configured to send the first result ciphertext.

In one or more embodiments, the sending unit 73 is specifically configured to send the first result ciphertext to the first party, so that the first party performs Montgomery reduction and a decryption operation on the first result ciphertext to obtain a first result plaintext.

In one or more other embodiments, the sending unit 73 is specifically configured to send the first result ciphertext to a third party, so that the third party performs a second homomorphic operation in the Montgomery state based on the first result ciphertext to obtain a second result ciphertext.

According to one or more implementations, the apparatus further includes an acquisition unit (not shown), configured to obtain a second converted ciphertext in the Montgomery state. Correspondingly, the operation unit 72 is configured to perform the first homomorphic operation on the first converted ciphertext and the second converted ciphertext to obtain the first result ciphertext.

Further, in one or more embodiments, the acquisition unit is configured to receive the second converted ciphertext from the first party.

In one or more other embodiments, the acquisition unit is configured to perform the first mapping operation and homomorphic encryption on local second plaintext data to obtain the second converted ciphertext.

According to one or more implementations, the first plaintext data is parameter data of a service prediction model, and the second plaintext data is characteristic data of a service object.

According to still another aspect, one or more embodiments of this specification further disclose a secure multi-party computation system, including a first party and a second party.

The first party is configured to perform a first mapping operation and homomorphic encryption on first plaintext data to obtain a first converted ciphertext in a Montgomery state, where the first mapping operation is used to convert data from an integer ring to the Montgomery state.

The first party is further configured to send the first converted ciphertext to a second party.

The second party is configured to perform a first homomorphic operation in the Montgomery state based on the first converted ciphertext to obtain a first result ciphertext in the Montgomery state, where the first homomorphic operation includes a modular multiplication operation.

According to the previous apparatuses and systems, in a homomorphic ciphertext computation stage of secure multi-party computation, a computation party can accelerate computation by using Montgomery reduction, thereby improving computation performance.

According to one or more embodiments of another aspect, a computer-readable storage medium is further provided. The computer-readable storage medium stores a computer program. When the computer program is executed in a computer, the computer is enabled to perform the methods executed by the parties in the previous secure multi-party computation processes.

According to one or more embodiments of still another aspect, a computation device is further provided. The device includes a memory and a processor. The memory stores executable code, and the processor implements the methods executed by the parties in the previous secure multi-party computation processes when executing the executable code.

A person skilled in the art should be aware that, in one or more of the previous examples, the functions described in this application can be implemented by using hardware, software, firmware, or any combination thereof. When these functions are implemented by using software, these functions can be stored in a computer-readable medium or transmitted as one or more instructions or code in the computer-readable medium.

The objectives, technical solutions, and beneficial effects of this application are further described in detail in the previous specific implementations. It is worthwhile to understand that the previous descriptions are merely specific implementations of this application, and are not intended to limit the protection scope of this application. Any modifications, equivalent replacements, modifications, etc. made on the basis of the technical solutions of this application shall be included within the protection scope of this application.

What is claimed is:

1. A computer-implemented method for secure multi-party computation, comprising:

converting, by a first device of a first party, first plaintext data to a Montgomery state by using a first mapping operation to obtain a first converted plaintext, wherein the first mapping operation is performed by one or more processors configured to execute Montgomery multiplication and Montgomery reduction;

performing a homomorphic encryption operation on the first converted plaintext in the Montgomery state by using a public key to obtain a first converted ciphertext; and sending, by the first device of the first party, the first converted ciphertext in the Montgomery state to a second device of a second party without converting the first converted ciphertext back to an integer ring, wherein a first homomorphic operation is performed in the Montgomery state based on the first converted ciphertext in the Montgomery state to obtain a first result ciphertext in the Montgomery state, wherein the first homomorphic operation comprises a modular multiplication operation performed by the one or more processors while the first converted ciphertext remains in the Montgomery state, and the public key is paired with a private key used to perform a decryption operation based on the first result ciphertext after the first result ciphertext is returned to the first device.

2. The computer-implemented method according to claim 1, further comprising:

receiving, by the first device of the first party, the first result ciphertext; and performing, by the first device of the first party, the Montgomery reduction and the decryption operation on the first result ciphertext to obtain a first result plaintext.

3. The computer-implemented method according to claim 1, further comprising:

performing, by the second device of the second party, the first homomorphic operation in the Montgomery state based on the first converted ciphertext to obtain the first result ciphertext in the Montgomery state, wherein the first homomorphic operation comprises the modular multiplication operation performed by the second device of the second party; and sending, by the second device of the second party, the first result ciphertext to a third device of a third party, wherein a second homomorphic operation is performed in the Montgomery state based on the first result ciphertext to obtain a second result ciphertext.

4. The computer-implemented method according to claim 1, further comprising:

obtaining, by the second device of the second party, a second converted ciphertext in the Montgomery state; and the first result ciphertext in the Montgomery state is obtained by operations comprising:

performing the first homomorphic operation on the first converted ciphertext and the second converted ciphertext to obtain the first result ciphertext.

5. The computer-implemented method according to claim 4, wherein the obtaining the second converted ciphertext in the Montgomery state comprises:

receiving the second converted ciphertext from the first device of the first party.

6. The computer-implemented method according to claim 4, wherein the obtaining the second converted ciphertext in the Montgomery state comprises:

performing the first mapping operation and homomorphic encryption on local second plaintext data of the second party to obtain the second converted ciphertext.

7. The computer-implemented method according to claim 6, wherein the first plaintext data is parameter data of a service prediction model, and the local second plaintext data is characteristic data of a service object.

8. A computer-implemented method for secure multi-party computation, wherein the computer-implemented method is executed by a first device of a first party and comprises:

converting first plaintext data to a Montgomery state by using a first mapping operation to obtain a first converted plaintext, wherein the first mapping operation is performed by one or more processors configured to execute Montgomery multiplication and Montgomery reduction;

performing a homomorphic encryption operation on the first converted plaintext in the Montgomery state by using a public key to obtain a first converted ciphertext;

sending the first converted ciphertext in the Montgomery state to a second device of a second party without converting the first converted ciphertext back to an integer ring;

receiving a result ciphertext from a third device of a third party, wherein the result ciphertext is obtained by performing a homomorphic operation in the Montgomery state based on the first converted ciphertext in the Montgomery state, and the homomorphic operation comprises a modular multiplication operation, wherein the first converted ciphertext and the result ciphertext remain in the Montgomery state during the homomorphic operation; and performing the Montgomery reduction and a decryption operation on the result ciphertext to obtain a result plaintext, wherein a private key paired with the public key is used to perform the decryption operation based on the result ciphertext.

9. The computer-implemented method according to claim 8, wherein the second party and the third party are the same party.

10. A computer-implemented method for secure multi-party computation, wherein the computer-implemented method is executed by a second device of a second party and comprises:

receiving a first converted ciphertext in a Montgomery state from a first device of a first party, wherein the first converted ciphertext is obtained by converting first plaintext data to the Montgomery state by using a first mapping operation to obtain a first converted plaintext and performing a homomorphic encryption operation on the first converted plaintext in the Montgomery state by using a public key, and wherein the first converted ciphertext is received while remaining in the Montgomery state and without having been converted back to an integer ring;

performing a first homomorphic operation in the Montgomery state based on the first converted ciphertext in the Montgomery state to obtain a first result ciphertext in the Montgomery state, wherein the first homomorphic operation comprises a modular multiplication operation, performed by one or more processors while the first converted ciphertext remains in the Montgomery state, and the public key is paired with a private key used to perform a decryption operation based on the first result ciphertext; and sending the first result ciphertext, wherein the first result ciphertext remains in the Montgomery state.

11. The computer-implemented method according to claim 10, wherein the sending the first result ciphertext comprises:

sending the first result ciphertext to the first device of the first party, wherein a Montgomery reduction and the decryption operation are performed on the first result ciphertext to obtain a first result plaintext.

12. The computer-implemented method according to claim 10, wherein the sending the first result ciphertext comprises:

sending the first result ciphertext to a third device of a third party, wherein a second homomorphic operation in the Montgomery state is performed based on the first result ciphertext to obtain a second result ciphertext.

13. The computer-implemented method according to claim 10, further comprising:

obtaining a second converted ciphertext in the Montgomery state; and the obtaining the first result ciphertext in the Montgomery state comprises:

performing the first homomorphic operation on the first converted ciphertext and the second converted ciphertext to obtain the first result ciphertext.

14. The computer-implemented method according to claim 13, wherein the obtaining the second converted ciphertext in the Montgomery state comprises:

receiving the second converted ciphertext from the first device of the first party.

15. The computer-implemented method according to claim 13, wherein the obtaining the second converted ciphertext in the Montgomery state comprises:

performing the first mapping operation and homomorphic encryption on local second plaintext data to obtain the second converted ciphertext.

16. The computer-implemented method according to claim 15, wherein the first plaintext data is parameter data of a service prediction model, and the local second plaintext data is characteristic data of a service object.

* * * * *